US011095450B2

(12) United States Patent
Purves

(10) Patent No.: US 11,095,450 B2
(45) Date of Patent: Aug. 17, 2021

(54) BLOCKCHAIN BASED ALIAS INTERACTION PROCESSING

(71) Applicant: Thomas Purves, San Francisco, CA (US)

(72) Inventor: Thomas Purves, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 302 days.

(21) Appl. No.: 16/245,678

(22) Filed: Jan. 11, 2019

(65) Prior Publication Data
US 2019/0222422 A1    Jul. 18, 2019

Related U.S. Application Data

(60) Provisional application No. 62/616,675, filed on Jan. 12, 2018.

(51) Int. Cl.
| | |
|---|---|
| *H04L 9/32* | (2006.01) |
| *H04L 9/06* | (2006.01) |
| *G06F 21/60* | (2013.01) |
| *H04L 29/12* | (2006.01) |
| *G06Q 20/40* | (2012.01) |
| *G06F 21/62* | (2013.01) |

(52) U.S. Cl.
CPC ......... *H04L 9/3239* (2013.01); *G06F 21/602* (2013.01); *G06F 21/6245* (2013.01); *G06Q 20/4014* (2013.01); *H04L 9/0637* (2013.01); *H04L 9/3213* (2013.01); *H04L 9/3231* (2013.01); *H04L 61/15* (2013.01); *H04L 61/30* (2013.01); *H04L 2209/38* (2013.01); *H04L 2209/56* (2013.01)

(58) Field of Classification Search
CPC ....................................... H04L 9/3239
See application file for complete search history.

(56) References Cited

U.S. PATENT DOCUMENTS

| | | | |
|---|---|---|---|
| 9,780,950 B1* | 10/2017 | Dundas | H04L 9/006 |
| 2005/0160292 A1* | 7/2005 | Batthish | H04L 63/0823 |
| | | | 726/5 |
| 2017/0132615 A1* | 5/2017 | Castinado | G06F 16/2255 |
| 2017/0132630 A1* | 5/2017 | Castinado | G06Q 20/4014 |
| 2018/0205725 A1* | 7/2018 | Cronkright | H04L 63/0838 |
| 2018/0254898 A1* | 9/2018 | Sprague | H04L 9/3271 |

* cited by examiner

*Primary Examiner* — Simon P Kanaan
(74) *Attorney, Agent, or Firm* — Kilpatrick Townsend & Stockton LLP

(57) ABSTRACT

A blockchain based alias directory may be utilized. Encrypted lists of aliases may be stored on the blockchain and may be accessible to network computers and secure gateways. Embodiments are directed to secure gateways and user devices for accessing the alias directory stored in the blockchain during a financial transaction. The user device may be provided with a list of aliases from which a user may select a payment account. Upon selection the user may be redirected to an identity verification system of the associated payment network.

19 Claims, 14 Drawing Sheets

BLOCKCHAIN BASED ALIAS INTERACTION PROCESSING

CROSS-REFERENCES TO RELATED APPLICATIONS

This application is a non-provisional of U.S. Provisional Patent Application No. 62/616,675, filed on Jan. 12, 2018, which is hereby incorporated by reference in its entirety for all purposes.

BACKGROUND

An "alias" can be information that can be an identity for some other information. For example, an e-mail address may be an identity for account information tied to that e-mail address. In another example, a 16 digits payment account number ending in 2385 may have an alias such as V 2385.

Because aliases are intended to hide real information to protect it, it is difficult to determine what entities are associated with the aliases. Current alias databases are operated by different entities. For example, many different banks may hold the payment accounts of its customers, and each bank has its own database which holds the aliases associated with its payment accounts. A central database that commingles payment account information and aliases from many entities such as many different banks may not be desirable. The privacy of the underlying information associated with the aliases for a specific entity (e.g., a bank's customers) needs to be protected, and commingling real information in an unprotected manner exposes such information to unauthorized entities.

In some cases, a third party or resource provider (e.g., a merchant) may want to contact the correct alias database or entity associated with the alias database to find information about the alias. For example, the resource provider can be a merchant that has received an alias and needs the information associated with that alias to process a payment transaction. However, the third party or resource provider does not know which alias database and corresponding entity to contact (from among many possible entities that operate their own alias databases), since the alias by nature obscures underlying information that might otherwise identify the entity and/or database that holds the alias and its associated underlying information. As a result, the third party or resource provider will need to contact each and every existing alias database with each and every entity to get the information associated with a particular alias. If, for example, there are ten different entities (e.g., ten banks) that hold aliases and corresponding information in ten different databases, then the third party or resource provider needs to contact each of the ten databases and entities to get the underlying information associated with the alias that it has. Thus, in a conventional system of this type, up to ten communications could be required to determine information associated with a single alias. This is inefficient.

It would be desirable to provide for a method and system that can reduce the number of potential messages that would be needed to obtain alias information while improving data security and accessibility.

Embodiments of the invention address these and other problems individually and collectively.

BRIEF SUMMARY

Embodiments of the invention are directed to a blockchain based alias directory.

One embodiment of the invention is directed to a method comprising: receiving, by a secure gateway, a request message including an identifier and a request for a list of aliases from a resource provider computer; retrieving, by the secure gateway, an encrypted list of aliases from a blockchain, wherein the encrypted list of aliases include at least one alias associated with the identifier; decrypting, by the secure gateway, the encrypted list of aliases, resulting in a decrypted list of aliases; transmitting, by the secure gateway, the decrypted list of aliases to the user device; receiving, by the secure gateway, a selected alias of the decrypted list of aliases from the user device; transmitting, by the secure gateway, a request for access data associated with the selected alias to the network computer; receiving, by the secure gateway, encrypted access data from the network computer; and transmitting, by the secure gateway, the encrypted access data to the resource provider computer.

Another embodiment of the invention is directed to a secure gateway. The secure gateway comprises a processor, and a computer readable medium. The computer readable medium comprises code, executable by the processor, for implementing a method comprising: receiving a request message including an identifier and a request for a list of aliases from a resource provider computer; retrieving an encrypted list of aliases from a blockchain, wherein the encrypted list of aliases include at least one alias associated with the identifier; decrypting the encrypted list of aliases, resulting in a decrypted list of aliases; transmitting the decrypted list of aliases to a user device; receiving a selected alias of the decrypted list of aliases from the user device; transmitting a request for access data associated with the selected alias to a network computer; receiving encrypted access data from the network computer; and transmitting the encrypted access data to the resource provider computer.

Another embodiment of the invention is directed to a method including providing an identifier to a resource provider computer to initiate a transaction. The method further includes a computer readable medium coupled to the processor and containing instructions for causing the processor to perform operations comprising: providing an identifier to a resource provider computer to initiate a transaction; receiving, from a blockchain, a list of aliases associated with the identifier, wherein each alias is associated with a network address of a network computer stored in the blockchain; selecting an alias of the list of aliases; and transmitting the selected alias to the network computer using the network address.

Another embodiment of the invention is directed to a user device configured or programmed to perform the above-noted method.

Further details regarding embodiments of the invention can be found in the Detailed Description and the Figures.

DETAILED DESCRIPTION

Figure 1:
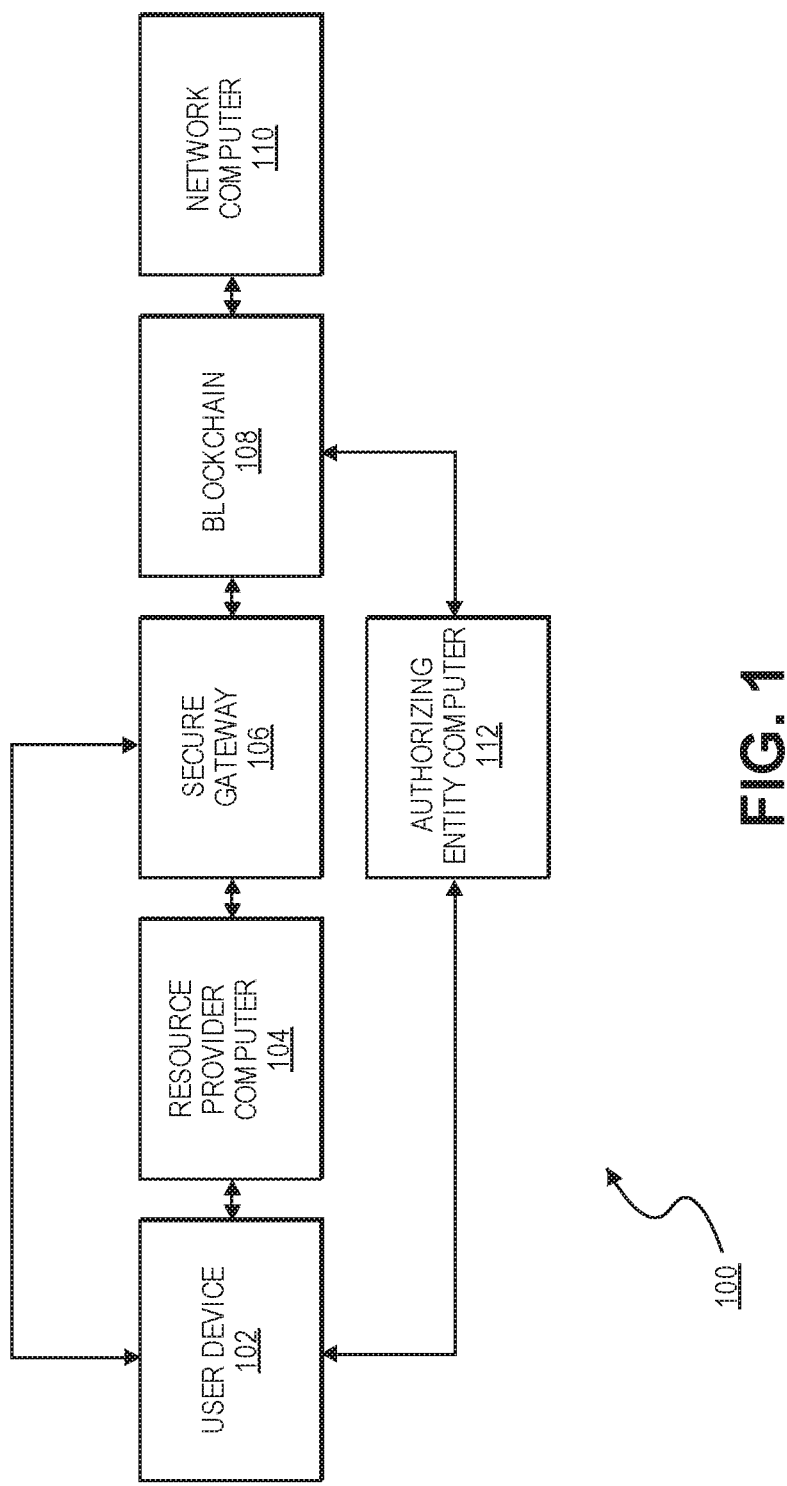
FIG. 1 shows a block diagram of a system illustrating a blockchain based alias directory system according to embodiments.

Prior to discussing embodiments of the invention, some terms can be described in further detail.

A "key" may include a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "public key" may include an encryption key that may be shared openly and publicly. The public key may be designed to be shared and may be configured such that any information encrypted with the public key may only be decrypted using an private key associated with the public key (i.e., a public/private key pair).

A "private key" may include any encryption key that may be protected and secure. A private key may be securely stored at an entity and may be used to decrypt any information that has been encrypted with an associated public key of a public/private key pair associated with the private key.

A "public/private key pair" may refer to a pair of linked cryptographic keys generated by an entity. The public key may be used for public functions such as encrypting a message to send to the entity or for verifying a digital signature which was supposedly made by the entity. The private key, on the other hand may be used for private functions such as decrypting a received message or applying a digital signature. In some embodiments, the public key may be authorized by a body known as a Certification Authority (CA) which stores the public key in a database and distributes it to any other entity which requests it. In some embodiments, the public key may be generated by another entity. The private key will typically be kept in a secure storage medium and will usually only be known to the entity. However, the cryptographic systems described herein may feature key recovery mechanisms for recovering lost keys and avoiding data loss. Public and private keys may be in any suitable format, including those based on Rivest-Shamir-Adleman (RSA) or elliptic curve cryptography (ECC).

An "access device" may be any suitable device that provides access to a system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile communication device. The POS terminal may or may not initiate processing of transactions.

An "alias" can be information that can be an identity for some other information. A "device alias" can be an information that can identifier a device while protecting other information. An example of a device alias can be a card alias, which can be information that a user can use to identify a card, while protecting underlying information about the card. For example, a card alias can be "Visa 8974" and can represent an underlying Visa card with an account number of 4000358228378974.

"Access data" may include any suitable data that can be used to access a resource or create data that can access a resource. In some embodiments, access data may be account information for a payment account. Account information may include a PAN, payment token, expiration date, card verification values (e.g., CVV, CVV2), dynamic card verification values (dCVV, dCVV2), an identifier of an issuer with which an account is held, etc. In other embodiments, access data could include data that can be used to access a location or to access secure data. Such information may be ticket information for an event, data to access a building, transit ticket information, passwords, biometrics or other credentials to access secure data, etc.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer.

A "resource provider" may be an entity that can provide a resource such as goods, services, information, and/or access. Examples of a resource provider include merchants, access devices, secure data access points, etc. A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

A "gateway computer" or "secure gateway" can be a server computer or a series of server computers that are configured to communicate with a device. The secure gateway may communicate with the device using over-the-air (OTA) messages or using any other communication networks and protocols. For example, the secure gateway may be configured to provide a secure communications channel (i.e., secure channel) with a device over which information can be transmitted securely to and from the device using a communications network, the Internet, and/or any other suitable communications network.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "user device" may be any suitable device that can interact with a user (e.g., a payment card or mobile phone). A user device may communicate with or may be at least a part of an access device or a server computer. User devices may be in any suitable form. Some examples of user devices include mobile communication devices such as cellular phones, personal computers (PCs), tablet PCs, wearable devices (e.g., smart watches), vehicles with communication capabilities (e.g., smart cars), etc.

A "mobile communication device" may comprise any electronic device that may be transported and operated by a user, which may also optionally provide remote communication capabilities to a network. Examples of remote communication capabilities include using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile communication devices include mobile phones (e.g. cellular phones), PDAs, tablet computers, net books, laptop computers, wearable devices (e.g., watches), vehicles such as automobiles and motorcycles, personal music players, hand-held specialized readers, etc. A mobile communication device may comprise any suitable hardware and software for performing such functions, and may also include multiple devices or components (e.g. when a device has remote access to a network by tethering to another device—i.e. using the other device as a modem—both devices taken together may be considered a single mobile communication device).

A "user" may include an individual. In some embodiments, a user may be associated with one or more personal accounts and/or user devices.

A "blockchain" can be a distributed database that maintains a continuously-growing list of records secured from tampering and revision. A blockchain may include a number of blocks of interaction records recorded on one or more nodes.

Each block in the blockchain can contain also include a timestamp and a link to a previous block. For example, each block may include or be appended to a hash of the previous block. Stated differently, interaction records in a blockchain may be stored as a series of "blocks," or permanent files that include a record of a number of transactions occurring over a given period of time. Blocks may be appended to a blockchain by an appropriate node after it completes the block and the block is validated. In embodiments of the invention, a blockchain may be distributed, and a copy of the blockchain may be maintained at each node in a blockchain network.

A "network computer" may be operated by a computer that can operate within a network. Examples of network computers can include payment network computers, authorizing entity computers, service provider computers, transport computers, resource provider computers, and the like.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN) and/or an expiration date. For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which sensitive data is replaced with substitute data. For example, a real credential (e.g., a primary account number (PAN)) may be tokenized by replacing the real account identifier with a substitute number that may be associated with the real credential. Further, tokenization can be applied to any other information to substitute the underlying information with a token. "Token exchange" or "de-tokenization" is a process of restoring the data that was substituted during tokenization. For example, a token exchange may include replacing a payment token with its associated primary account number (PAN). Further, de-tokenization or token exchange may be applied to any other information to retrieve the substituted information from a token. In some embodiments, token exchange can be achieved via a transactional message, such as an ISO message, an application programming interface (API), or another type of web interface (e.g., web request).

An "authorization request message" may be a message that requests permission to conduct an interaction. For example, an authorization request message may include an electronic message that is sent to a payment processing network and/or an issuer of a payment card to request authorization for a transaction. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. In some embodiments, it may be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

FIG. 1 shows a block diagram of a system 100 according to some embodiments. The system 100 comprises a user device 102, a resource provider computer 104, a secure gateway 106, a blockchain 108, a network computer 110, and an authorizing entity computer 112. For simplicity of illustration, a certain number of components are shown in FIG. 1. It is understood, however, that embodiments of the invention may include more than one of each component.

The components in FIG. 1 may be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The resource provider computer 104 may include a resource provider host site. The resource provider host site may be a website such as a merchant Web site, a data access Website, or a secure location site. The resource provider computer 104 may also include or be in operative communication with an access device such as a POS terminal.

The blockchain 108 may store alias information including account aliases, device aliases, user aliases, etc. The blockchain 108 may reside on one or more computers in the system 100, including some that may not be specifically depicted in FIG. 1. In some embodiments, the blockchain 108 may store card art for an access card (e.g., a payment card), a token reference ID for a token (e.g., a payment token associated with the payment card), a card alias such as the last four digits of an access card, and a card provider's name in association with an identifier or user alias in a block in the blockchain 108. The token reference ID may be associated with a token which may represent access data. In some embodiments, multiple different entities (e.g., different banks) may store aliases in the blockchain 108. Because the blockchain 108 does not contain underlying sensitive data associated with aliases, different entities may access the blockchain 108.

In some embodiments, the blockchain 108 may have specific read and write permissions associated with each stored alias. For example, an alias stored by a first entity may only be able to be written by the first entity, but may be read by the first entity and other entities given permission to read. Read and write permissions may be added and altered by each respective entity. These entities may be entities that also operate a network computer 110. In some embodiments, entities may only be allowed to read and write to their own aliases, thereby preventing entities from viewing or writing to the aliases of users other than their own.

The network computer 110 may be a processing network computer in some embodiments. The processing network computer may be configured to provide authorization services, and clearing and settlement services for payment transactions. A processing network computer may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. Furthermore, the payment processing network may include a server computer and may use any suitable wired or wireless telecommunications network, including the Internet.

In some embodiments, the network computer 110 may be in operative communication with the user device 102, the resource provider computer 104, the secure gateway 106, and the authorizing entity computer 112. It may also be in communication with and between the authorizing entity computer 112 and a transport computer (not shown), which may reside between the resource provider computer 104 and the network computer 110.

Figure 2:
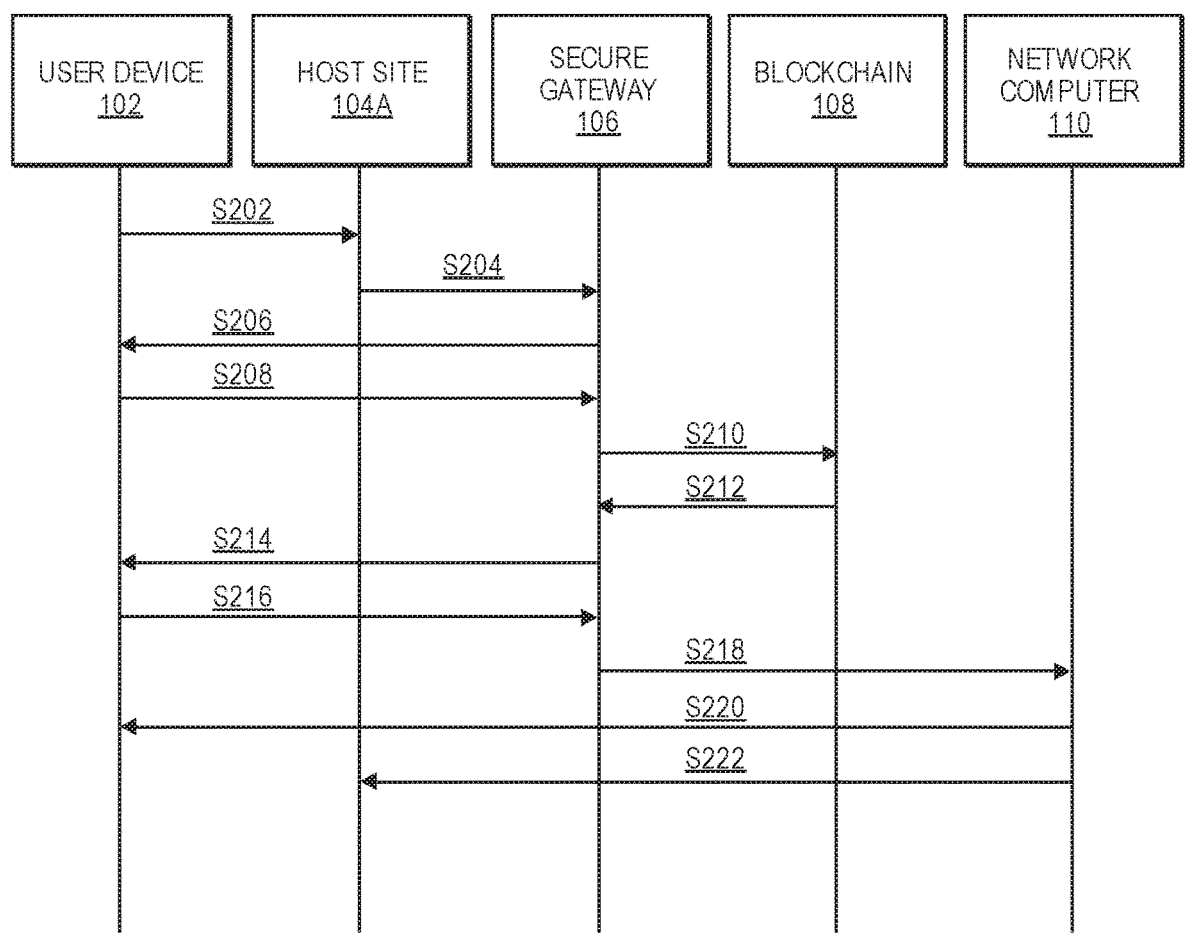
FIG. 2 shows a process flow diagram illustrating a method according to an embodiment.

FIG. 2 shows a diagram illustrating a method according to an embodiment of the invention. FIG. 2 may be described in reference to a user performing a transaction using a previously stored identifier. The identifier may be characterized as a user alias in some instances. With reference to FIGS. 1-2, the identifier (e.g., an e-mail address, username, phone number, hashed versions thereof, etc.) may be a reference to the user's access data and the identifier may correspond to information stored in blockchain 108. Such information may include a token reference ID, card art, a card alias such as the last four digits of a card number, an associated network computer, card metadata, etc.

In some embodiments, the information in the blockchain 108 may also include a network address of a network computer associated with the card alias. The network address may be in the form of an active link such as a hyperlink. The network address can be used to retrieve access data corresponding to the card alias from an appropriate network computer 110.

At step S202, the user may use the user device 102 to initiate a transaction with the host site 104A. The host site 104A may be a resource provider host site (e.g., a merchant Web site) and may be associated with the resource provider computer 104. The user device 102 may transmit an identifier to the host site 104A. The identifier may identify the user of the user device 102. In some embodiments, the identifier may be associated with the user. For example, the identifier may be a name of the user, user name, email address, phone number or other personal identifier. In some embodiments, the identifier may be a token reference ID.

In some embodiments, the user may be a consumer shopping for resources on a merchant website or via a merchant applicant. Host site 104A may be accessed by the user device 102. In such embodiments, the transaction may be initiated by a user interacting with a payment button on the user device 102.

At step S204, the host site 104A may transmit a request message including the identifier and a request for a list of card aliases to the secure gateway 106.

At step S206, after receiving the request message, the secure gateway 106 may transmit a verification request message to the user. The verification request message may contain information for the user to input into the user device 102. In some embodiments, the verification request message may include a one-time password. For example, the verification request message may be an e-mail which includes the one-time password. In some embodiments, the secure gateway 106 may transmit the verification request message to the user device 102. For example, the user device may receive the verification request message and may display the contents of the verification request message to the user of the user device 102.

In other embodiments, a third party service provider may provide identity verification In such embodiments, the transmission of the verification request message may trigger identity confirmation preparations by the third party service provider. The third party service provider may include an authorization application executing on user device 102 to provide a one-time password for entry by the user into an interface application or the host site 104A.

At step S208, the user may input the one-time password into the user device 102. The user device 102 may then transmit the one-time password to the secure gateway 106. In some embodiments, the user device 102 may transmit a verification response message including the one-time password or other authentication token to the secure gateway 106.

At step S210, after receiving the verification response message from the user device 102, the secure gateway 106 may determine if the verification response message is sufficient to authenticate the user of the user device 102. If the user is verified and authenticated, then the secure gateway 106 may allow the user to access the blockchain 108. The secure gateway 106 may retrieve an encrypted list of card aliases. The encrypted list of card aliases may include at least one card alias associated with the identifier.

The secure gateway 106 may query the blockchain 108 for the identifier. Pointers in the ledger to each block containing an active card alias entry for the identifier may be used to access each block. The card aliases and corresponding information may be retrieved in an encrypted list. The card aliases stored on the blockchain 108 may be encrypted with a public key associated with a private key on or associated with the user device 102.

Other retrieved information corresponding to the initial identifier supplied by the user device 102 may include a card provider identifier and/or network computer address. These data may enable the secure gateway 106 to identify and connect to the network computer 110 associated with the selected card alias. The network computer 110 may be a card issuer and or a payment network associated with a user payment account (e.g., a credit or debit card account).

At step S212, the blockchain 108 may transmit the encrypted list of card aliases including at least one card alias associated with the identifier to the secure gateway 106. After receiving the encrypted list of card aliases, the secure gateway 106 may use a user device private key to decrypt the encrypted list of aliases. In some embodiments, the secure gateway 106 may request the use of the user device private key from the user device 102.

In some embodiments, in which the blockchain 108 is hosted on the secure gateway 106, steps S210 and S212 may be combined. In this case, the secure gateway may simply access the blockchain 108 rather than transmit a data request to a separate computer hosting the blockchain 108.

At step S214, the secure gateway 106 may transmit the decrypted list of card aliases to the user device 102. In some embodiments, the decrypted list of card aliases may be displayed on the user device 102 to the user. For example, the list of card aliases may be presented to the user via a user interface on a display of the user device 102. As is shown in greater detail with reference to FIGS. 5A and 5B, the list of card aliases may be displayed to the user as a list of cards associated with the identifier (e.g., the username or email addresses of the user).

In some embodiments, the user may select one card alias of the decrypted list of card aliases, resulting in a selected card alias. The user may select a card or other payment account from the displayed list of payment accounts. The selection may identify a payment method with which the user desires to make a purchase. The modality of the selection may vary according to the nature of the user interface and input methods of the user device 102.

At step S216, the user device 102 may transmit the selected card alias to the secure gateway 106. The transmission may be made directly from the user device 102 to the secure gateway 106 or may be routed through the resource provider operating the host site 104A.

At step S218, after receiving the selected card alias, the secure gateway 106 may transmit a request for access data including the selected card alias to the network computer 110. In some embodiments, the selected card alias may include information about which network computer 110 that the selected alias is associated with. The secure gateway 106 may then determine the network computer 110 to which the request for access data should be transmitted. In this regard, as noted above, the secure gateway 106 may obtain the network address of the network computer 110 from the blockchain 108.

At step S220, the network computer 110 may transmit encrypted access data associated with the selected alias to the user device 102. The user device 102 may then decrypt the encrypted access data and may use it to conduct a transaction by providing it to the resource provider host site 104A or another access device operated by the resource provider. In this case, the network computer 110 may encrypt the access data with public key associated with the user device 102 and the user device 102 may decrypt it with a corresponding private key. Alternatively, shared symmetric keys held by the user device 102 and the network computer 110 could alternatively be used.

In an alternative to step S220, as shown in step S222, the network computer 110 may transmit encrypted access data directly to the host site 104A so that the user of the user device 102 may conduct a transaction. In some embodiments, the resource provider computer 104 may decrypt the access data (e.g., using a key associated with the user device, or a specific key pair shared between the network computer 110 and the resource provider computer 110). In other embodiments, the access data may include a token such as a payment token. The resource provider computer host site 104A may then proceed with the transaction using the access data.

Once the resource provider 104 has the access data, the resource provider can initiate an access transaction to access data held by the host site 104A, access a secure location (e.g., a building) associated with the host site 104A, or conduct a payment transaction with the host site 104A. If a payment transaction is conducted, then the resource provider can generate an authorization request message including the access data. The authorization request message may be transmitted to the network computer 110 via a transport computer (not shown in FIG. 2). The network computer 110 may then transmit the authorization request message to an authorizing entity computer (not shown in FIG. 2), and the authorizing entity computer may authorize or decline the transaction. The authorizing entity computer may then transmit an authorization response message back to the resource provider via the network computer and the transport computer. At a later time, a clearing and settlement process may occur between the transport computer, the authorizing entity computer, and the network computer.

In some embodiments, the network computer 110 may de-tokenize the access data in the authorization request message, if the access data includes a payment token, to obtain a real PAN (primary account number) in place of the payment token. The authorization request message may be modified to include the real PAN and this may be transmitted to the authorizing entity computer for authorization. An authorization response message may be transmitted and a clearing and settlement process may be conducted as described above.

Figure 3:
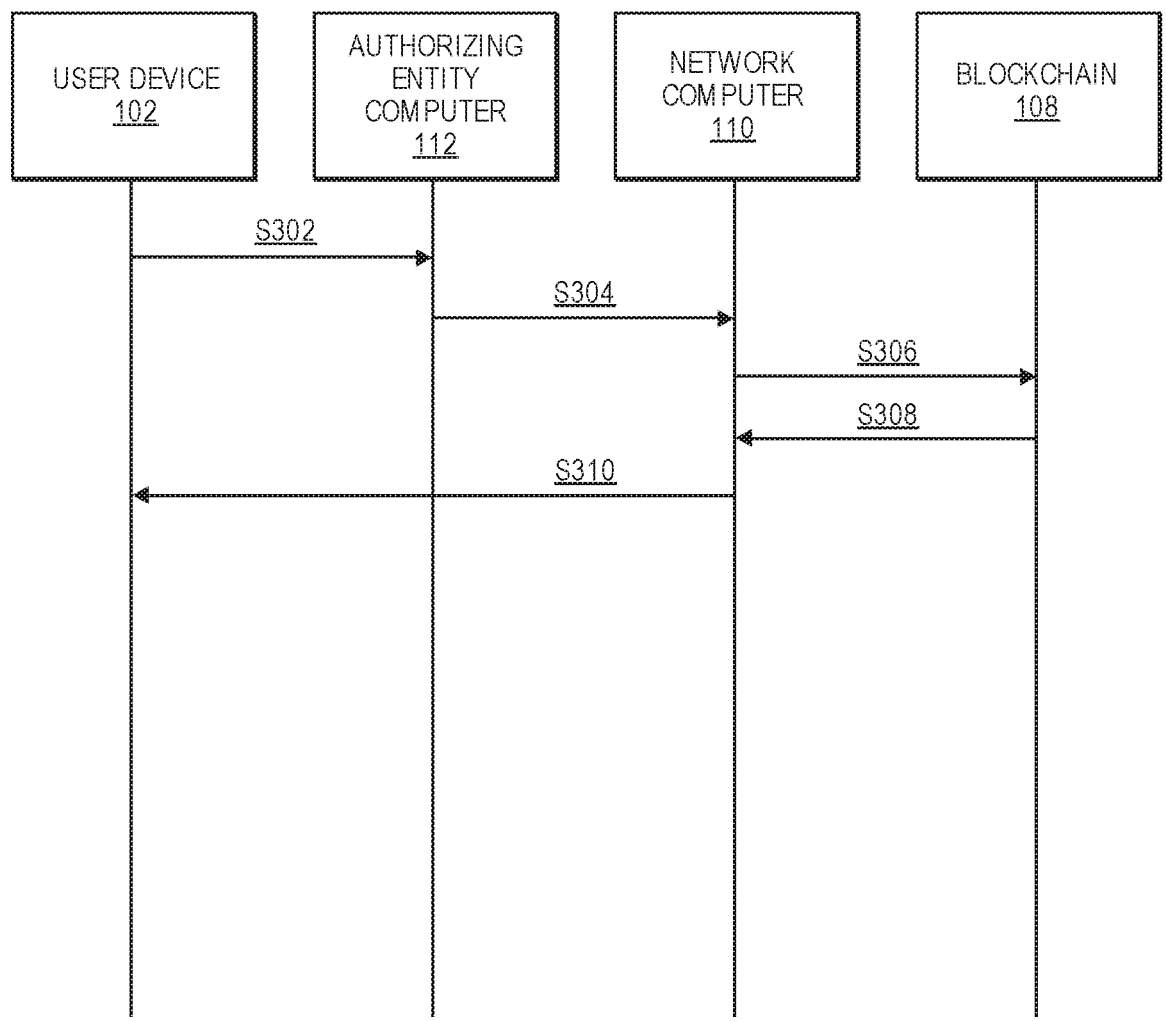
FIG. 3 shows a process flow diagram illustrating a provisioning and enrollment method according to an embodiment.

FIG. 3 shows a diagram illustrating a provisioning and enrollment method according to an embodiment of the invention. The user of the user device 102 may proceed to enroll a card with the authorizing entity of the authorizing entity computer 112. In some embodiments, the card may be a credit card.

At step S302, the user device 102 may transmit a request to activate the card to the authorizing entity computer 112. Such requests may occur automatically during the opening of a new credit or debit card with an issuer. Alternatively, the request may be made for an already active card.

At step S304, the authorizing entity computer 112 may enroll the user of the user device 102. The authorizing entity computer 112 may transmit data relating to the card and information regarding the user to the network computer 110. This information may include card art, the last four digits of the card, the token reference ID (e.g., corresponding to a payment token, which represents a primary account number), and an identifier such as an account identifier (e.g., username or e-mail address) to gain electronic access to the card account.

At step S306, after receiving the data relating to the card and the information regarding the user, the network computer 110 may use a permissioned network computer to append the user and card data (i.e. identifier, card art, card alias such as the last four digits of the card, token reference ID, associated network computer address or identifier, etc.) to the blockchain 108. In some embodiments, the blockchain 108 may be used by other network computers or payment networks. In some embodiments, network computer 110 or the blockchain 108 may encrypt at least some of the user and card data using a public key associated with the user device 102.

At step S308, the network computer 110 may receive an enrollment confirmation message from the blockchain 108. The enrollment confirmation message may include a message indicating success or failure of enrollment.

At step S310, the network computer 110 may transmit the enrollment confirmation message to the user device 102. In some embodiments, the network computer 110 may transmit the enrollment confirmation message and the token.

Figure 4A:
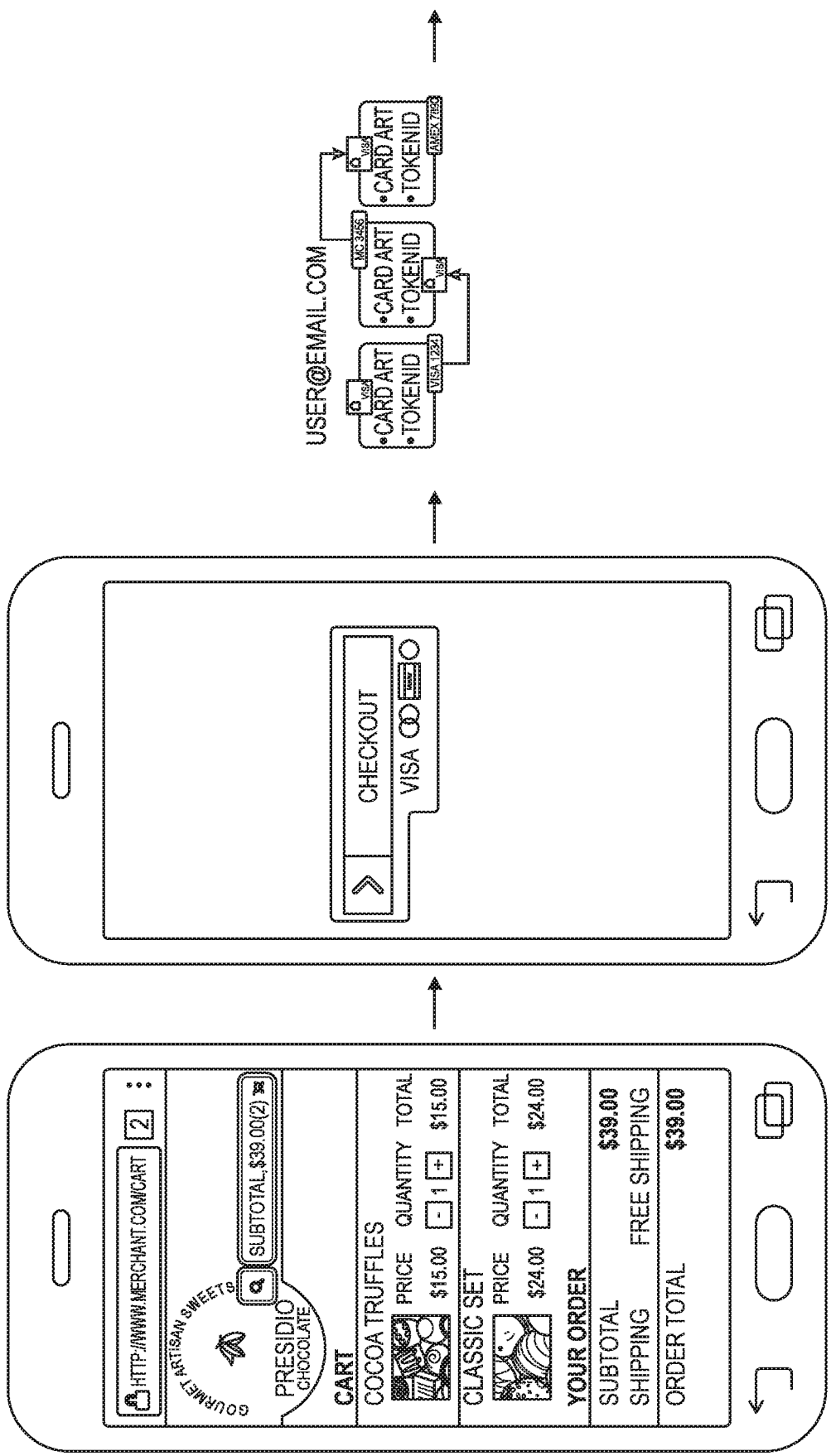
FIGS. 4A and 4B show the beginning and end of a diagram illustrating a method according to an embodiment.
Figure 4B:
Figure 4B:

FIGS. 4A and 4B show a diagram illustrating a general framework of a method according to an embodiment of the invention. FIGS. 4 and 4B show a digital shopping application 402, a secure gateway initiator SDK (software development kit) 404, a blockchain 406, a second secure gateway initiator SDK 408, and a digital card facilitator 410.

At the digital shopping application 402, the user of the user device 102 may select resources for purchase. In various embodiments, the digital shopping application may be associated with a host site of a resource provider (e.g., a merchant). When the user has completed his shopping, the user may proceed to a checkout screen featuring the secure gateway initiator SDK 404.

The secure gateway initiator SDK 404 may be selected by the user of the user device 102 to initiate a transaction for the selected resources. In some embodiments, the secure gateway initiator SDK 404 may be a "checkout" button. The secure gateway initiator SDK 404 may initiate the secure gateway 106.

The blockchain 406 may retrieve an encrypted list of aliases via a secure gateway (e.g., secure gateway 106). In this example, the blockchain 406 is represented by three blocks or entries which are associated with an alias identifier (e.g., user@e-mail.com), and each block or entry may contain information regarding different cards, each block or entry including card art, a token reference ID, a card alias such as the last for digits of the card, and an identifier for the card provider, which may be a network address, routing number, or other identifier enabling identification of the card provider. Exemplary contents of individual blocks of the blockchain 108 are described in greater detail with reference to FIG. 7.

A second secure gateway initiator SDK 408, associated with the secure gateway 106, may display the list of card aliases after they have been retrieved from the blockchain

406, and may be decrypted by the secure gateway. In the displayed example, the second secure gateway initiator SDK 408 may display a list of selectable payment cards, e.g. credit or debit cards associated with the user. The user of the user device may select at least one card alias of the list of card aliases. This selection may represent the payment account with which the user would like to complete the transaction.

After a card alias has been selected, the digital card facilitator 410 may display information associated with the selected card alias as well as other relevant information, such as the initial identifier (e.g., the email address), the user's name, and the user's address. The user of the user device 102 may proceed with the transaction.

Figure 5A:
FIGS. 5A and 5B show the beginning and end of a diagram with screen shots illustrating a user experience according to an embodiment.
Figure 5B:
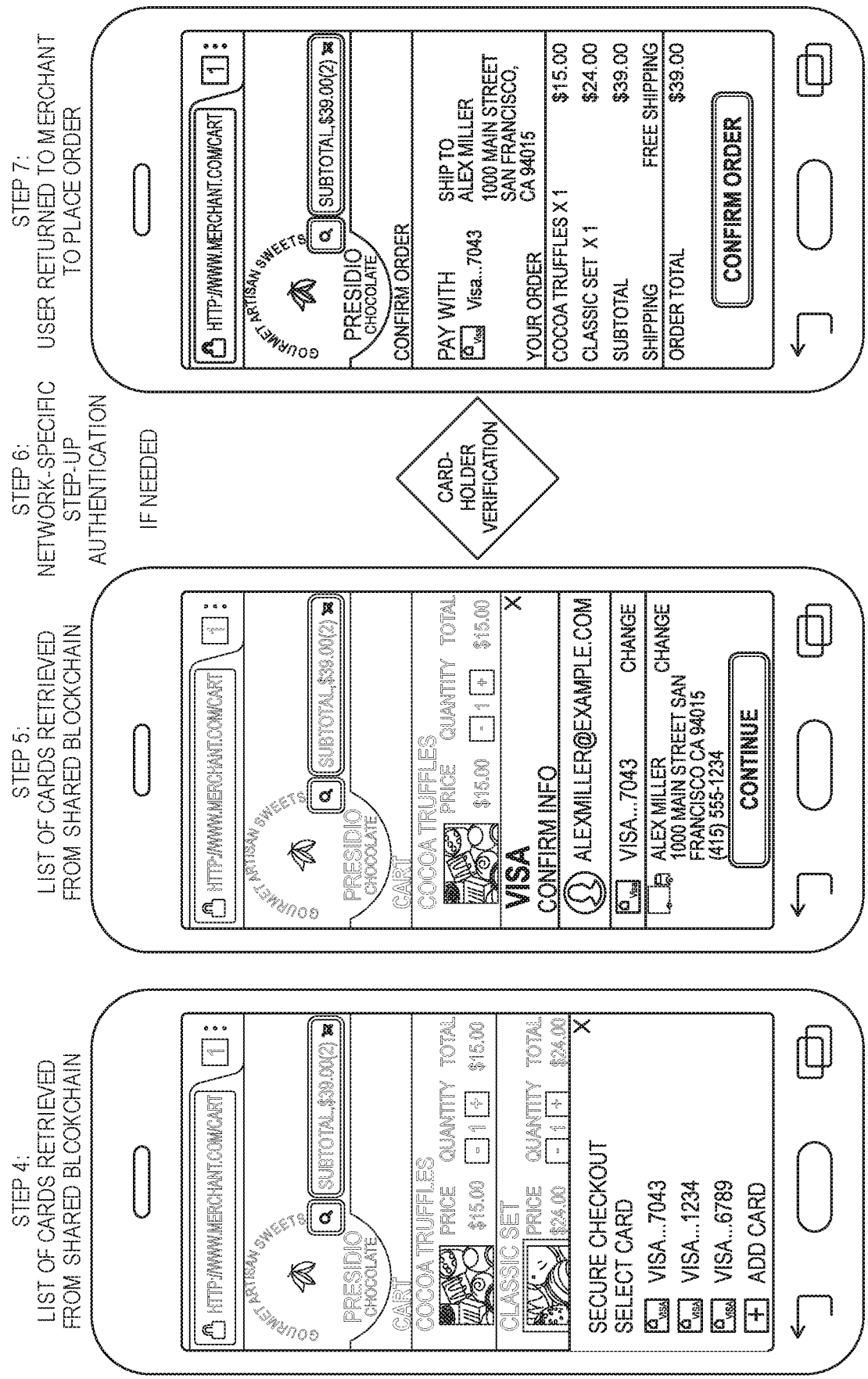

FIGS. 5A and 5B shows a diagram illustrating a method with an existing user on a new device according to an embodiment of the invention. FIGS. 5A and 5B may be described in reference to the user device 102. With reference to FIGS. 1-5, there may be additional steps performed by other connected devices, for example, the resource provider computer 104, the secure gateway 106, the blockchain 108, the network computer 110, and the authorizing entity computer 112.

At step 1, the user of the user device 102 may select a payment button to initiate a transaction. In some embodiments, the user device 102 may receive an input to initiate a transaction. The payment button may be a secure gateway initiator SDK 404. When the user interacts with this payment button, a request may be sent from the user device 102 to the secure gateway 106 via the host site 104A of the resource provider 104. Interaction with the payment button may occur through an input means of the user device 102.

At step 2, user device 102 may prompt the user of the user device 102 to input an identifier. In some embodiments, the user device 102 may receive the identifier such as an alias identifier. The identifier may be a username, email address, phone number, personal identification number (PIN) or other or other user identifier that may be commonly associated with one or more payment accounts. For example, the identifier may be a piece of information commonly given to card issuers during the card issuance process, and by which a card may be linked to a user.

At step 3, the user device 102 may prompt the user to verify their identity. In some embodiments, the user device 102 may then receive a one-time password or other means of identity verification. The password may be provided by the resource provider, an authorizing entity or a third party entity responsible for identification verification. In some embodiments, the one-time password may be sent to an email address such as when the identifier is an email address. In some embodiments, the one-time password may be transmitted to a user's phone via SMS or other messaging protocol. This may be advantageous in situations in which the identifier is the user's cell phone number. Other embodiments may require the user to interact with a third party application executing on the user device 102 to receive a one-time password that may be input to a prompt appearing on the host site 104A.

If the identity of the user has been verified in step 3, then at step 4 the user device 102 may receive the list of card aliases representing payment accounts associated with the identifier provided by the user directly form a computing device hosting the blockchain 108. In some embodiments, the list of payment accounts may be received by the user device 102 from the secure gateway 106, retrieved from the blockchain 108. The received list of card aliases is displayed by the user device 102. The user device 102 then prompts the user to select at least card alias from the list of card aliases. The list of card aliases may be associated with payment accounts associated with several different payment networks and issuers. A user may have multiple payment accounts processed by the same payment network but issued by different issuers. Similarly, a single issuer may have provided a user with multiple payment accounts for the same payment network.

At step 5, the user device 102 may receive a selection including at least one card alias associated with at least one payment account from the blockchain 108. The selected payment account may be the account with which the user desires funds to be withdrawn in exchange for the resources selected for purchase. In some embodiments, the user may be able to select multiple card aliases and may thus divide the payment for the desired resource amongst multiple payment accounts.

At step 6, the user device 102 may optionally perform network specific step-up authentication. Based on the card provider identifier associated with the card alias of the selected payment account, the user device may be placed in communication with a network computer 110 associated with the payment network of the payment account. This payment network may initiate a second authentication process prior to authorization of the transaction using the payment account.

In some embodiments, the network-specific step-up authentication may verify the user. For example, the user may be verified through the use of comparing an input biometric template to a stored biometric template. In this manner, the user may be directed to the network computer 110 of an entity responsible for verifying the user and user payment account with an associated payment network. The authentication process may differ based on the payment network associated with the payment account. Private keys, passwords, PINs, biometrics, and other forms of authentication may be employed.

At step 7, the user device 102 may return to the resource provider host site. In some embodiments, the user may then confirm and/or place an order associated with the transaction. Once the user has been authenticated by the network computer 110, the transaction may be considered to be legitimate and the user may submit his/her order. Additional processing may occur as described above with respect to FIG. 2.

In some embodiments, the operations described with reference to new use of the systems and methods may vary slightly in instances of use by previously authenticated users on a known user device 102. Reference is made again to FIGS. 5A and 5B to illustrate the process of transaction flow.

The user device 102 may display a resource provider host site (e.g., host sire 140A). At step 1, the user of the user device 102 may initiate a transaction via the resource provider host site. For example, the user may select a "checkout" button. Because the user operating the user device 102 has been previously authenticated by the secure gateway 106, the process flow may advance to step 4.

At step 4, the user device 102 may retrieve and/or receive a list of payment accounts via the secure gateway 106 and/or a computing device hosting the blockchain 108. The user device 102 may display the list of payment accounts. The user device 102 may prompt the user to select at least one card of the list of payment accounts.

In some embodiments, the user device 102 may display the selection of at least one card of the list of cards. At step 5, the user device 102 may receive a selection of at least one payment account of the list of payment accounts.

At step 6, the user device 102 may perform native step-up authentication. In some embodiments, the native step-up authentication may include verifying the user's identity. For example, the user may be prompted to input a biometric sample. The user device 102 may convert the biometric sample into a biometric template and compare the biometric template with a previously stored biometric template. Similarly, the user may be prompted to input a PIN, password, etc.

At step 7, the user device 102 may display the host site 104A. In some embodiments, the user may then confirm and/or place an order associated with the transaction.

Figure 6:
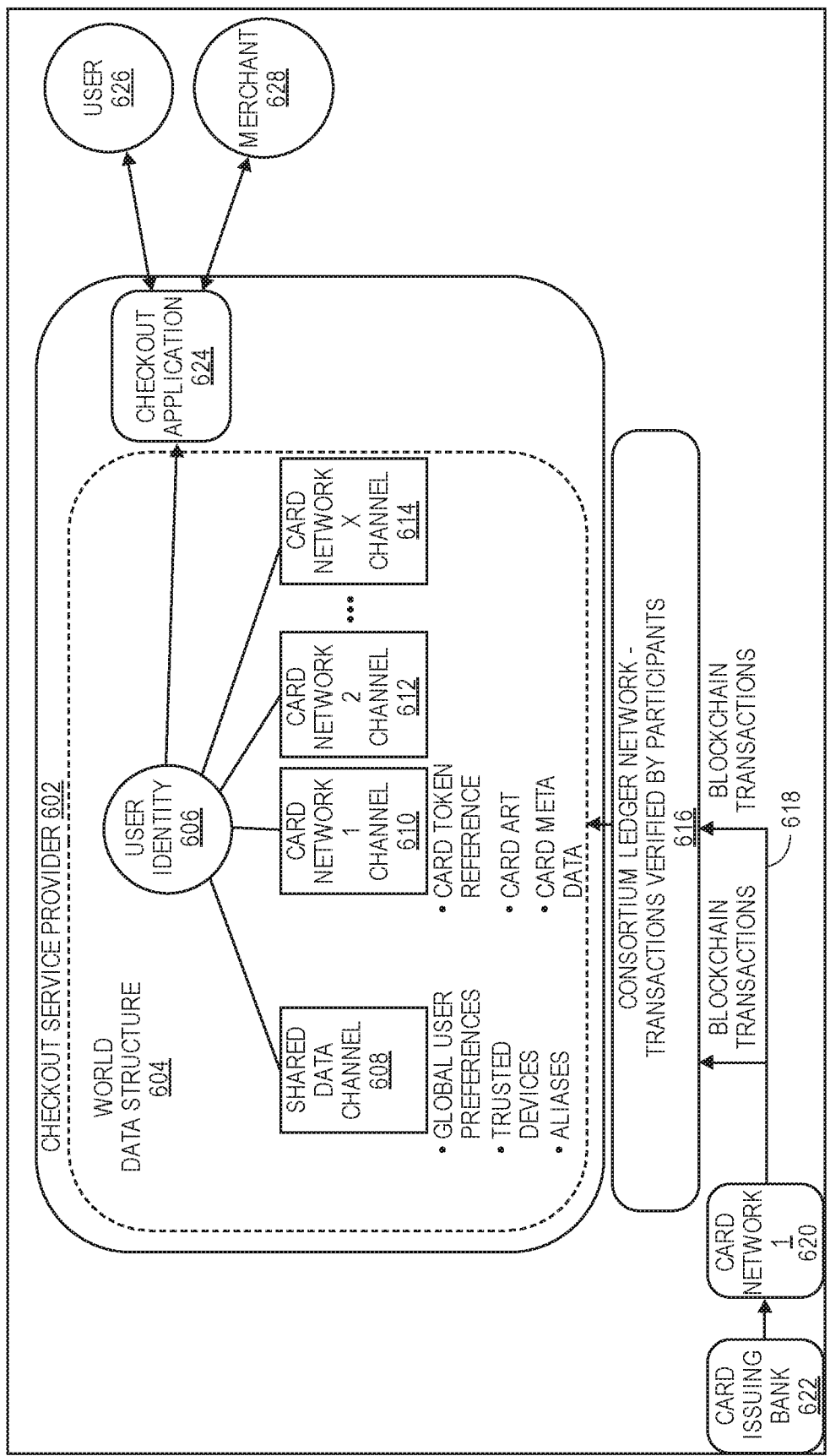
FIG. 6 shows a diagram of another system according to an embodiment.

FIG. 6 shows a block diagram of a system 600 comprising a number of components according to some embodiments of the invention. With reference to FIGS. 1-6, the system comprises a checkout service provider 602, a global data structure 604, a user identity 606, a shared data channel 608, a card network 1 channel 610, a card network 2 channel 612, a card network X channel 614, a consortium ledger network 616, blockchain transactions 618, a card network 1 620, a card issuing bank 622, a checkout application 624, a user 626, and a merchant 628.

The checkout service provider 602 may be part of or associated with the resource provider computer 104, the secure gateway 106, and the network computer 110 in the previously described embodiments. The checkout service provider 602 may include the global data structure 604 and the checkout application 624.

The global data structure 604 may include a copy of the blockchain 108. In some embodiments, the global data structure 604 may be stored at the checkout service provider 602. Additional copies of the global data structure 604 may be stored on numerous other computing devices, some or all of which may be in operative communication with the checkout service provider 602.

The checkout application 624 may be associated with the host site 104A associated with the computer of the resource provider 104. In some embodiments, the checkout application 624 may be a web site rendered on a user device 102 via a web browser.

The user identity 606 may be an identifier associated with the user 626. In some embodiments, the user identity 606 may connect between or be common across the shared data channel 608, the card network 1 channel 610, the card network 2 channel 612, the card network X channel 614, and the checkout application 624. The user identity 606 (e.g., an e-mail address) may allow a checkout application 624 to determine an alias at the shared data channel 608. The user identity 606 may be used as a search query to the copy of the global data structure 604 to identify card aliases associated with the user The shared data channel 608 may be a data channel accessible by every computer in the system. The shared data channel 608 may be capable of storing global user preferences, a list of trusted devices, and card aliases. The shared data channel may include the primary blockchain 108. All authorized computers may write to the shared data channel 608.

The card network 1 channel 610 may be a data channel accessible by, for example, the card network 1 620. The card network 1 channel 610 may be capable of storing the card token reference, card art, and card metadata. Each card issuer or payment network, e.g., 620, 622, may write to the shared data channel 608, but may only read their respective card channels. For example, card network 1 620 may add payment account information associated with a user to the blockchain via shared data channel 608 to generate new card aliases stored within blocks. However, the card network 1 620 may only view aliases associated with it, via card network 1 channel 610. In some embodiments, the card networks may only view and write to aliases appearing within their own card network channel.

The generation of private channels in which card networks or issuers may access aliases associated with their own users, enables card networks and issuers to maintain and review accurate information about their own users. This private channel structure also prevents other issuers and card networks from viewing or writing to the alias information of users of other issuers or payment networks. The blockchain is thus privacy preserving of the user information for different issuers and payment networks, while still enabling the accurate maintenance of aliases by individual issuers or payment networks.

The card network 2 channel 612 may be a data channel accessible by card network 2 (not shown). The card network 2 channel 612 may be capable of storing the card token reference, card art, card provider identifier, and card metadata. In some embodiments, the card network 2 channel may be different than the card network 1 channel 610.

The card network X channel 614 may be a data channel capable of storing the card token reference, card art, card provider identifier, and card metadata. In some embodiments, the card network X channel 614 may be different with the card network 1 channel 610 and card network 2 channel 612.

In some embodiments, the blockchain or consortium ledger network 616 may store transaction data. Entities can then use the consortium ledger network 616 to build and manage their part of the global data structure 604.

The consortium ledger network 616 may also include a blockchain. The consortium ledger network 616 may verify transactions using a blockchain. Blockchain transactions may include blocks with transaction data including access data, resource provider identifiers, transaction amounts, and other data.

Figure 7:
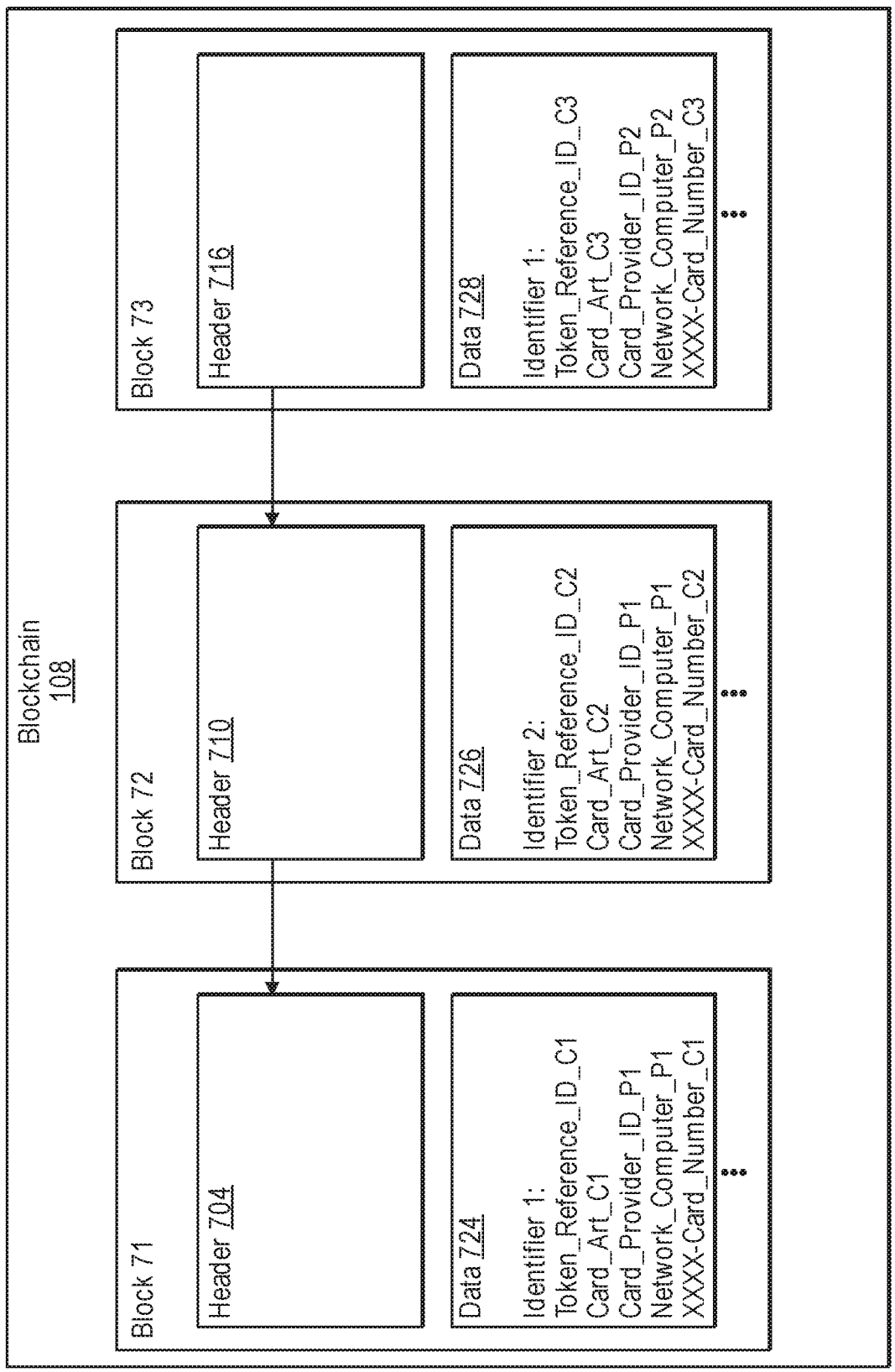
FIG. 7 is an example of a portion of a blockchain according to an embodiment.

FIG. 7 shows a block diagram of a system illustrating a blockchain according to an embodiment. Blockchain 108 may include a number of blocks 71, 72, 73, each block including respective headers 704, 710, and 716. Each header 704, 710, 716 may include data elements including version numbers, previous block hashes, Merkle roots, and timestamps. Each block may also include data 724, 726, 728 including information about each entity being registered, an identifier for the entity, a token reference ID, etc.

The data included in each block of the blockchain 108 may include one or more card aliases. For the purposes of providing a simple explanation of the various embodiments, each of blocks 71, 72, and 73 is illustrated as containing one alias. In practice, each block may contain many card aliases.

Data 724 of block 71 contains Identifier 1 and data associated with Identifier 1. The data associated with Identifier 1 may include a token reference ID for card C1, card art for card C1, a card provider ID for provider P1, a network computer address of provider P1, a card alias such as the last 4 digits of the card C1, and any other suitable card metadata.

Data 726 of block 72 contains Identifier 2 and data associated with Identifier 2. The data associated with Identifier 2 may include a token reference ID for card C2, card art for card C2, card provider ID for provider P1, a network computer address for provider P1, a card alias such as the last 4 digits of the card C2, and any other card metadata. Thus, Identifier 2 is associated with a user B different from Identifier 1 associated with user A, but both have cards that are issued or processed by the same provider, P1. Because both Identifier 1 and Identifier 2 have the same provider, these aliases may appear within the same card network channel. However, these aliases may not be viewed by other card providers or payment networks.

Data 728 of block 73 contains Identifier 1 and associated data. Data associated with Identifier 1 may include a token reference ID for card C3, card art for card C3, a card provider ID for provider P2, a network computer address for provider P2, a card alias such as the last 4 digits of the card C3, and any other card metadata. Data from blocks 724 and 728 may be presented to a user device of a user when searching the blockchain 108 using Identifier 1.

Figure 8:
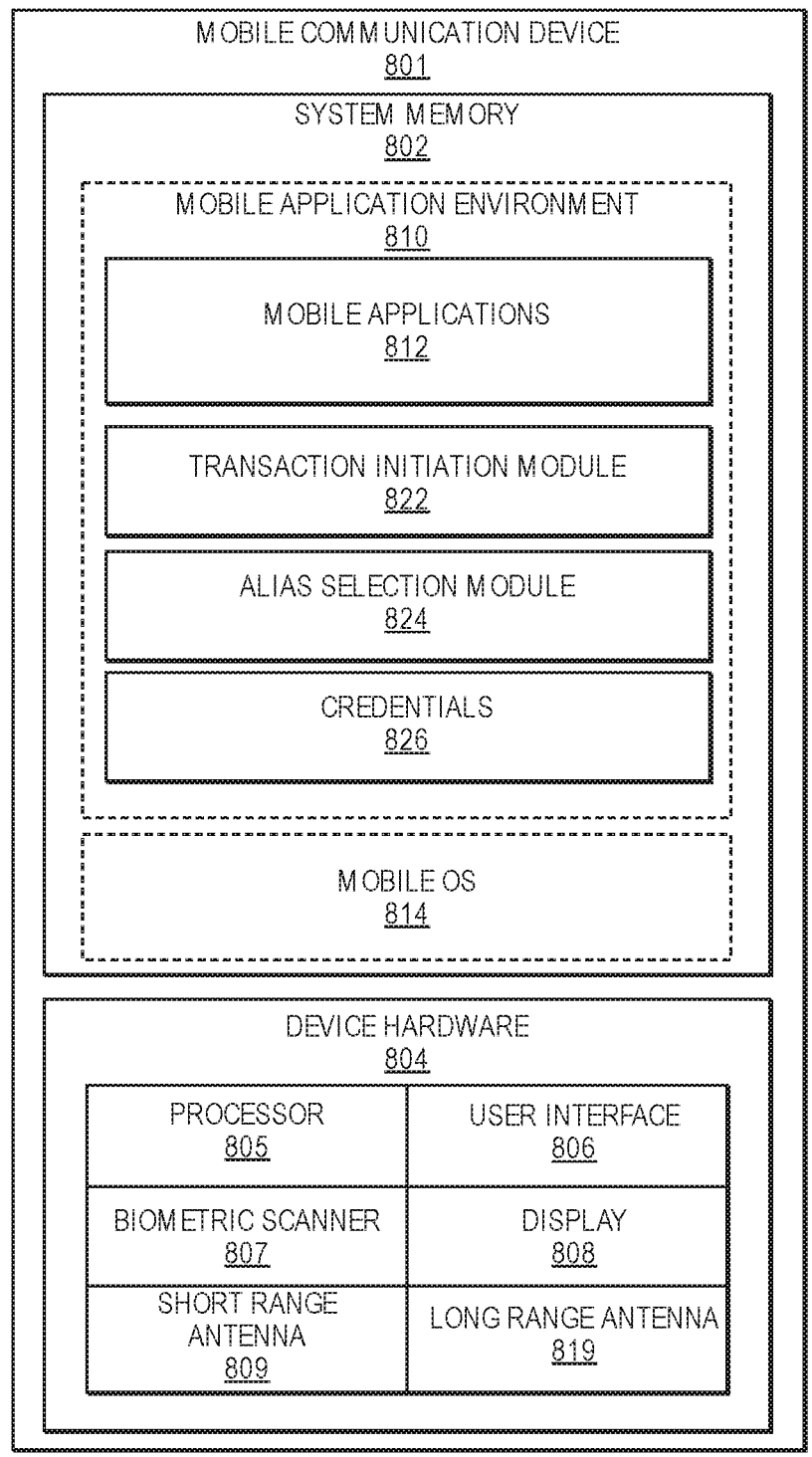
FIG. 8 shows a diagram of a mobile communication device according to an embodiment.

FIG. 8 illustrates a mobile communication device 801 according to an embodiment of the invention. Mobile communication device 801 may include device hardware 804 coupled to a system memory 802.

Device hardware 804 may include a processor 805, a short range antenna 809, a long range antenna 819, a biometric scanner 807, a user interface 806, and a display 808 (which may be part of the user interface 806). The processor 806 can be implemented as one or more integrated circuits (e.g., one or more single core or multicore microprocessors and/or microcontrollers), and is used to control the operation of mobile communication device 801. The processor 805 can execute a variety of programs in response to program code or computer-readable code stored in the system memory 802, and can maintain multiple concurrently executing programs or processes.

The long range antenna 819 may include one or more RF transceivers and/or connectors that can be used by mobile communication device 801 to communicate with other devices and/or to connect with external networks. The user interface 806 can include any combination of input and output elements to allow a user to interact with and invoke the functionalities of mobile communication device 801, The biometric scanner 807 may be configured to capture any suitable biometric including a fingerprint, retina, facial image, etc. The short range antenna 809 may be configured to communicate with external entities through a short range communication medium (e.g. using Bluetooth, Wi-Fi, infrared, NFC, etc.). The long range antenna 819 may be configured to communicate with a remote base station and a remote cellular or data network, over the air.

The system memory 802 can be implemented using any combination of any number of non-volatile memories (e.g., flash memory) and volatile memories (e.g. DRAM, SRAM), or any other non-transitory storage medium, or a combination thereof media. System memory 802 may store a mobile OS 814 and a mobile application environment 810 where one or more mobile applications 812 reside (e.g., a payment application such as a mobile wallet application, merchant application, mobile location application, etc.) to be executed by the processor 805. Also, the system memory 802 may store computer code, executable by the processor 805, for performing any of the functions described herein.

The system memory 802 may also store a transaction initiation module 822, an alias selection module 824, as well as credentials 826, The transaction initiation module 822 may include instructions of code for receiving an input from a user such as via voice or touch screen as an API call to a payment application executing on the mobile communication device 801. The API call may indicate a selection for a transaction to begin and authorization to take place, which may include transmitting a request for a list of aliases containing payment account information. The alias selection module 824 may contain instructions to receive and display a list of aliases received from a blockchain. The display may include a list of cards including card cart images of each card. The alias selection module 824 may receive a user input indicating one of the aliases in the displayed list and may transmit the selection to a network computer.

System memory 802 may also store credentials 825, Credentials 825 may include information identifying the mobile communication device 801 and/or the user of the mobile communication device 801. Examples of credentials may include a public key associated with the mobile communication device 801 and/or a user of the mobile communication device 801, a digital signature (e.g., the public key of the mobile communication device 801 signed by a key of the authentication system), payment credentials such as PANs or payment tokens, biometric data (e.g., biometric samples or templates), etc.

Figure 9:
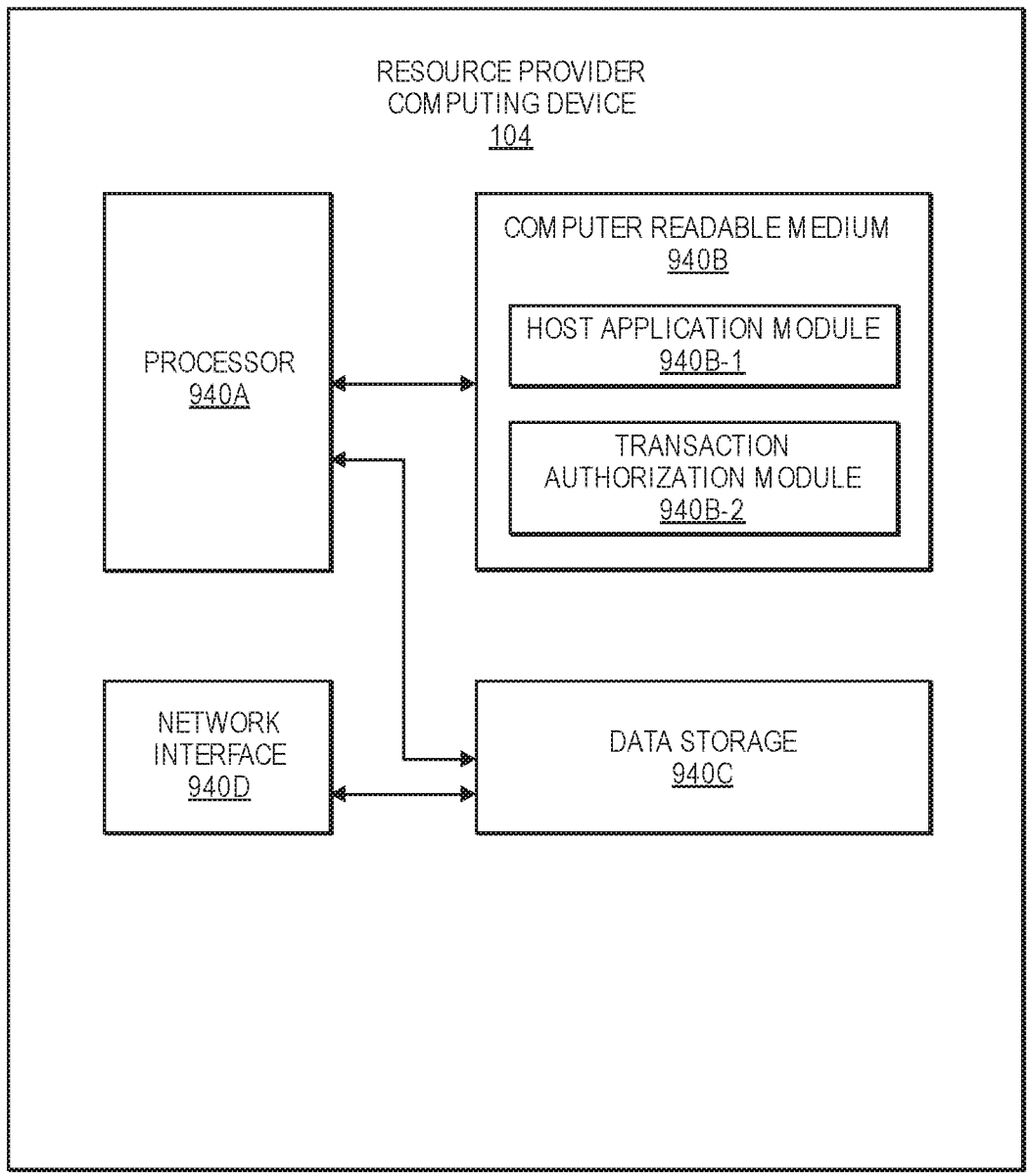
FIG. 9 shows a block diagram of a resource provider computer according to an embodiment.

FIG. 9 shows a block diagram illustrating some components in a resource provider computer 104. The resource provider computer 104 may have one or more processors 940A, coupled to a computer readable medium 940B, data storage 940C and network interface 940D.

The computer readable medium 940B may comprise a host application module 940B-1 and a transaction authorization module 940B-2. The host application module 940B-1 may comprise instructions for instructing the one or more processors 940A to provide data in support of hosting a website or web application. The transaction authorization module 940B-2 may comprise instructions for instructing the one or more processors 940A to commence steps for verifying and authorizing a transaction initiated by a user visiting the host site.

Figure 10:
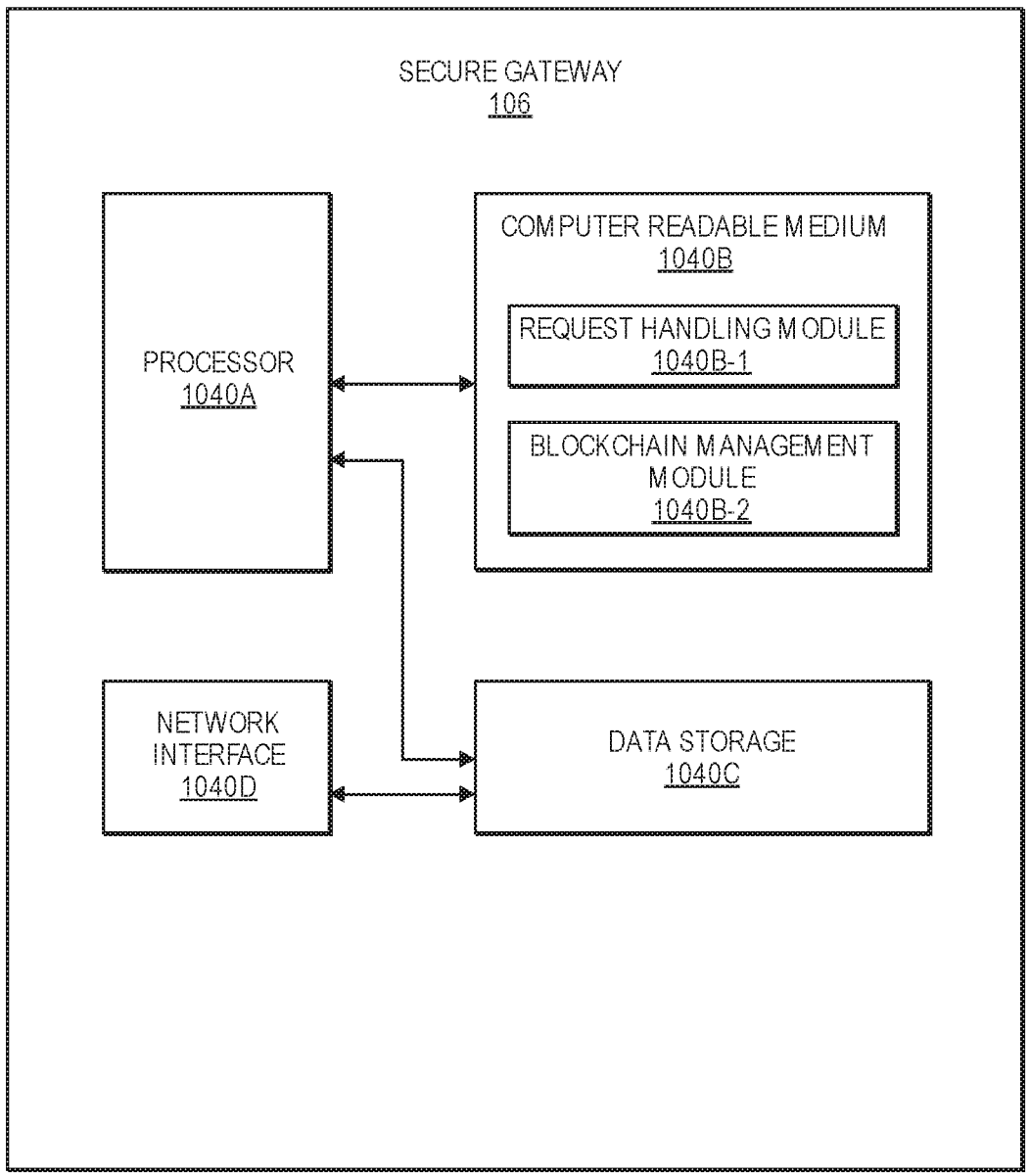
FIG. 10 shows a block diagram of a secure gateway according to an embodiment.

FIG. 10 shows a block diagram illustrating some components in a secure gateway 106. With reference to FIGS. 1-10, the secure gateway 106 may have one or more processors 1040A, coupled to a computer readable medium 1040B, data storage 1040C and network interface 1040D.

The computer readable medium 1040B may comprise a request processing module 1040B-1 and a blockchain management module 1040B-2. The request processing module 1040B-1 may comprise instructions for instructing the one or more processors 1040A to receive a request for a list of aliases and transmit, initiate user verification and provide a list of aliases associated with the identifier of the request. The blockchain management module 1040B-2 may comprise instructions for instructing the one or more processors 1040A to receive new alias information from card providers, generate blocks of the blockchain, update the blockchain ledger, process blockchain queries, and return query results.

The computer readable medium 104B may comprise code, executable by the processor 1040A, for implementing a method comprising: receiving a request message including an identifier and a request for a list of aliases from a resource provider computer; retrieving an encrypted list of aliases from a blockchain, wherein the encrypted list of aliases include at least one alias associated with the identifier; decrypting the encrypted list of aliases, resulting in a decrypted list of aliases; transmitting the decrypted list of aliases to a user device; receiving a selected alias of the decrypted list of aliases from the user device; transmitting a request for access data associated with the selected alias to a network computer; receiving encrypted access data from the network computer; and transmitting the encrypted access data to the resource provider computer.

Figure 11:
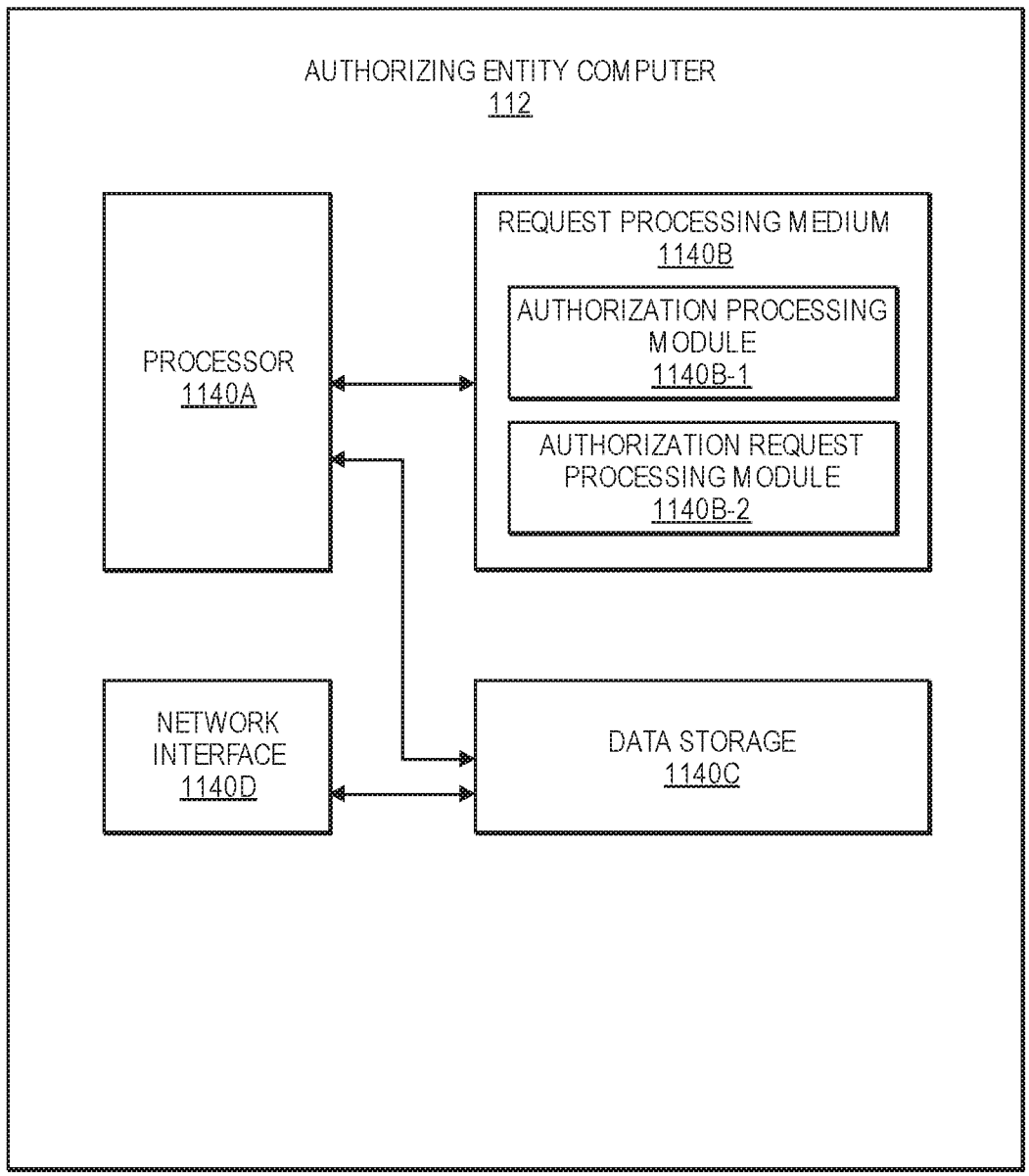
FIG. 11 shows a block diagram of an authorizing entity computer according to an embodiment.

FIG. 11 shows a block diagram illustrating some components in an authorizing entity computer 112. With reference to FIGS. 1-11, the authorizing entity computer 112 may have one or more processors 1140A, coupled to a computer readable medium 1140B, data storage 1140C and network interface 1140D.

The computer readable medium 1140B may comprise a request processing module 1140B-1 and an authorization processing module 1140B-2. The request processing module 1140B-1 may comprise instructions for instructing the one or more processors 1140A to receive a request for authorization of a transaction. The authorization processing module 1140B-2 may comprise instructions for instructing the one or more processors 1140A to verify a transaction and approve or deny the transaction and then transmit an authorization or declination response.

Figure 12:
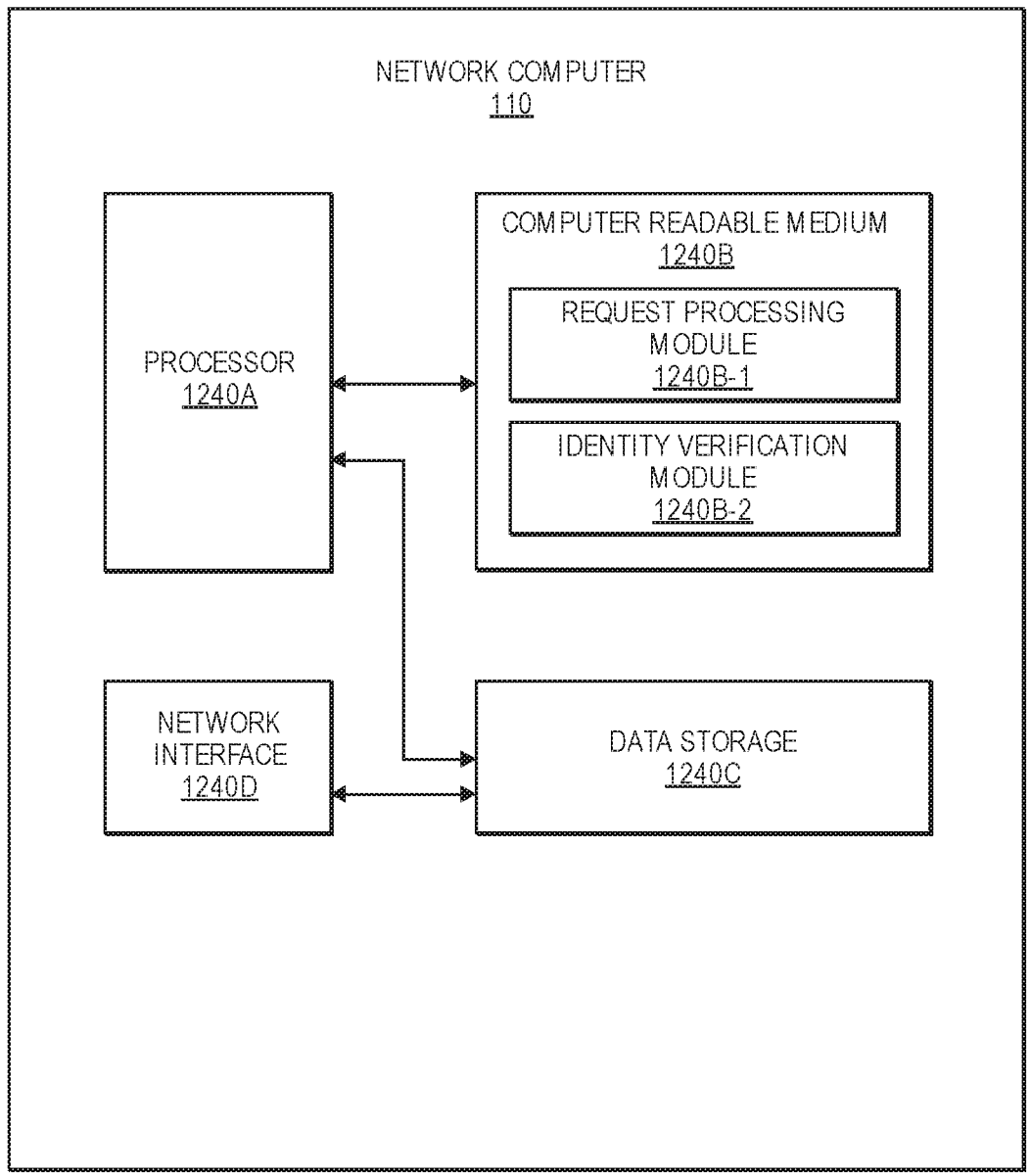
FIG. 12 shows a block diagram of a network computer according to an embodiment.

FIG. 12 shows a block diagram illustrating some components in a network computer 110. With reference to FIGS. 1-12, the network computer 110 may have one or more processors 1240A, coupled to a computer readable medium 1240B, data storage 1240C and network interface 1240D.

The computer readable medium 1240B may comprise a request processing module 1240B-1 and an identity verification module 1240B-2. The request processing module 1240B-1 may comprise instructions for instructing the one or more processors 1240A to receive a request for use of a payment account associated with a payment network of the network computer 110. The identity verification module 1240B-2 may comprise instructions for instructing the one or more processors 1240A to authenticate the user with the payment network of the network computer 110 such as by password, key usage, biometric input, or the like.

Embodiments of the invention have a number of advantages. Such advantages include the ability to allow different entities to maintain data security and privacy associated with device aliases, while allowing different entities to query a single blockchain to obtain the necessary data to process a transaction. The blockchain can be continuously updated in a real time basis. Compared to conventional systems and methods that can require many different authorizing entities or networks to be contacted to determine data associated with a particular identifier and device alias, embodiments of the invention only require the different authorizing entities or networks to communicate with a blockchain one time before receiving the data that it needs.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
    receiving, by a secure gateway, a request message including an identifier and a request for a list of device aliases associated with a user from a resource provider computer;
    retrieving, by the secure gateway, an encrypted list of device aliases from a blockchain, wherein the encrypted list of device aliases include at least one device alias associated with the identifier;
    decrypting, by the secure gateway, the encrypted list of device aliases, resulting in a decrypted list of device aliases;
    transmitting, by the secure gateway, the decrypted list of device aliases to a user device;
    receiving, by the secure gateway, a selected device alias from the decrypted list of device aliases from the user device, the selected device alias being used to process a payment transaction initiated by the user;
    transmitting, by the secure gateway, a request for access data associated with the selected device alias to a network computer;
    receiving, by the secure gateway, access data from the network computer; and
    transmitting, by the secure gateway, the access data to the resource provider computer or the user device.

2. The method of claim 1, further comprising:
    retrieving, by the secure gateway from the blockchain, a plurality of network addresses associated with a plurality of network computers, the plurality of network addresses include a network address for the network computer, and wherein transmitting the request for access data comprises transmitting to the network address of the network computer associated with the selected device alias.

3. The method of claim 2, wherein the network computer addresses are in the form of active links.

4. The method of claim 1, wherein the access data received from the network computer is encrypted.

5. The method of claim 1, wherein the access data is data that can access a secure location.

6. The method of claim 1, wherein the access data transmitted to the resource provider or the user device is unencrypted.

7. The method of claim 1, wherein the identifier is an e-mail address or a phone number.

8. The method of claim 6, wherein the blockchain stores a token reference identifier associated with the selected device alias.

9. A secure gateway comprising:
a processor;
a computer readable medium coupled to the processor and containing instructions for causing the processor to perform operations comprising:
receiving a request message including an identifier and a request for a list of device aliases associated with a user from a resource provider computer;
retrieving an encrypted list of device aliases from a blockchain, wherein the encrypted list of device aliases include at least one device alias associated with the identifier;
decrypting the encrypted list of device aliases, resulting in a decrypted list of device aliases;
transmitting the decrypted list of device aliases to a user device;
receiving a selected device alias from the decrypted list of device aliases from the user device, the selected device alias being used to process a payment transaction initiated by the user;
transmitting a request for access data associated with the selected device alias to a network computer;
receiving access data from the network computer; and
transmitting the access data to the resource provider computer or the user device.

10. The secure gateway of claim 9, wherein the computer readable medium is further configured with instructions to cause the processor to perform operations comprising:
retrieving from the blockchain a plurality of network addresses associated with a plurality of network computers, the plurality of network addresses include a network address for the network computer, and wherein transmitting the request for access data comprises transmitting to the network address of the network computer associated with the selected device alias.

11. The secure gateway of claim 10, wherein the network computer addresses are in the form of active links.

12. The secure gateway of claim 10, wherein the access data received from the network computer is encrypted.

13. The secure gateway of claim 10, wherein the access data is data that can access a secure location.

14. The secure gateway of claim 9, wherein the network computer is in communication with a plurality of authorizing entity computers.

15. The secure gateway of claim 9, wherein each device alias stored in the blockchain includes one or more of a token reference identifier, card art, and a card provider identifier.

16. The secure gateway of claim 15, wherein the blockchain stores a token reference identifier associated with the selected device alias.

17. A user device comprising:
a processor,
a computer readable medium coupled to the processor and containing instructions for causing the processor to perform operations comprising:
providing an identifier to a resource provider computer to initiate a payment transaction initiated by a user;
receiving, from a blockchain, a list of device aliases associated with the identifier, wherein each device alias is associated with a network address of a network computer stored in the blockchain;
selecting a device alias of the list of device aliases; and
transmitting the selected device alias to the network computer using the network address, the selected device alias being used to process the payment transaction initiated by the user.

18. The user device of claim 17, wherein each device alias stored in the blockchain includes one or more of a token reference identifier, card art for a card of the user, and a card provider identifier.

19. The user device of claim 17, wherein the alias is a card alias.

* * * * *